United States Patent
Bragdon et al.

(10) Patent No.: US 11,216,587 B2
(45) Date of Patent: Jan. 4, 2022

(54) LOG TOKENIZATION IN AN INTEGRATION PLATFORM

(71) Applicant: salesforce.com, inc., San Francisco, CA (US)

(72) Inventors: Andrew Craig Bragdon, Brentwood, CA (US); Ignacio Agustin Manzano, Buenos Aires (AR); Balasubramanian Narasimhan, Saratoga, CA (US)

(73) Assignee: salesforce.com, inc., San Francisco, CA (US)

( * ) Notice: Subject to any disclaimer, the term of this patent is extended or adjusted under 35 U.S.C. 154(b) by 326 days.

(21) Appl. No.: 16/389,778

(22) Filed: Apr. 19, 2019

(65) Prior Publication Data

US 2020/0334376 A1 Oct. 22, 2020

(51) Int. Cl.
*G06F 17/00* (2019.01)
*H04L 29/06* (2006.01)
*G06F 21/62* (2013.01)

(52) U.S. Cl.
CPC .............................. *G06F 21/6245* (2013.01)

(58) Field of Classification Search
CPC . G06F 21/6245; G06F 21/6254; H04L 9/0618
See application file for complete search history.

(56) References Cited

U.S. PATENT DOCUMENTS

| | | | | |
|---|---|---|---|---|
| 2015/0039359 | A1* | 2/2015 | Katakol | G06Q 10/063 705/7.11 |
| 2018/0189502 | A1* | 7/2018 | Kumar | G06F 21/6254 |
| 2020/0092178 | A1* | 3/2020 | Nelson | H04L 41/145 |
| 2020/0125336 | A1* | 4/2020 | Mills | G06F 8/43 |
| 2020/0311304 | A1* | 10/2020 | Parthasarathy | G06F 11/3006 |
| 2020/0334135 | A1* | 10/2020 | Bragdon | G06F 8/60 |
| 2020/0334376 | A1* | 10/2020 | Bragdon | G06F 21/6245 |
| 2020/0364525 | A1* | 11/2020 | Mats | G06K 19/071 |
| 2020/0387623 | A1* | 12/2020 | Bayon | G06F 21/6227 |
| 2021/0117570 | A1* | 4/2021 | Bayon | G06F 21/6245 |

* cited by examiner

*Primary Examiner* — Lizbeth Torres-Diaz
(74) *Attorney, Agent, or Firm* — Sterne, Kessler, Goldstein & Fox P.L.L.C.

(57) ABSTRACT

Disclosed herein are system, method, and device embodiments for implementing log tokenization in an integration platform system. An integration platform may provide a declaratively-configurable logger asset for deployment in an integration-application design tool, and package the declaratively configurable logger asset in an integration application at least partially built via the integration-application design tool. In addition, the integration application may identify sensitive information in original log data of the integration application, and generate modified log data based on tokenization of the sensitive information. Further, the integration application may log the modified log data into a log file.

20 Claims, 11 Drawing Sheets

Data Domain Management Interface 606

Edit Data Domain - default

Data Domain

Data domain name: [default]
Description: [ ]
Data domain type: [Credit card number ▼]

Token Options | Credit card options

Preserve the first [0] and the last [4] characters of the data
☐ Force token characters into illegal range
With a width of [2] characters, offset [4] characters from the [ ▼]
☐ Luhn digit test
◉ Generated token must pass Luhn test  ◉ Generated token must fail Luhn test

[OK]  [Cancel]

FIG. 6B

LOG TOKENIZATION IN AN INTEGRATION PLATFORM

CROSS REFERENCE TO RELATED APPLICATIONS

This application is related to co-pending U.S. patent application Ser. No. 16/389,783, by Bragdon, et al., "Codeless Logging In An Integration Platform," filed herewith which is hereby incorporated by reference in its entirety.

BACKGROUND

An integration platform may allow an organization to design, implement, and deploy software systems that integrate and harness resources from across an organization's technical landscape. Such resources may include applications, services, and data sources regardless of the operating systems, programming languages, data types, and other differences in the system resources. An integration platform may include functional components to design integration applications, retrieve and transform data, interact with various application programming interfaces (APIs), deploy integration applications to users, and otherwise maintain such applications.

Often, execution of an integration application generates logging information that can be used for diagnosing application failure and auditing application events. In some instances, the logging information may include sensitive and/or confidential information provided by an end-user of the integration application. The presence of sensitive and/or confidential information in logging information may increase the risk of fraudulent activity or unauthorized use of the sensitive and/or confidential information. Further, in some instances, exposure of the sensitive and/or confidential information may violate governmental regulations concerning end-user information.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIGS. 6A-6B illustrate example GUIs of a management application for setting a policy for log tokenization in an integration platform, according to some embodiments.

Figure 1:
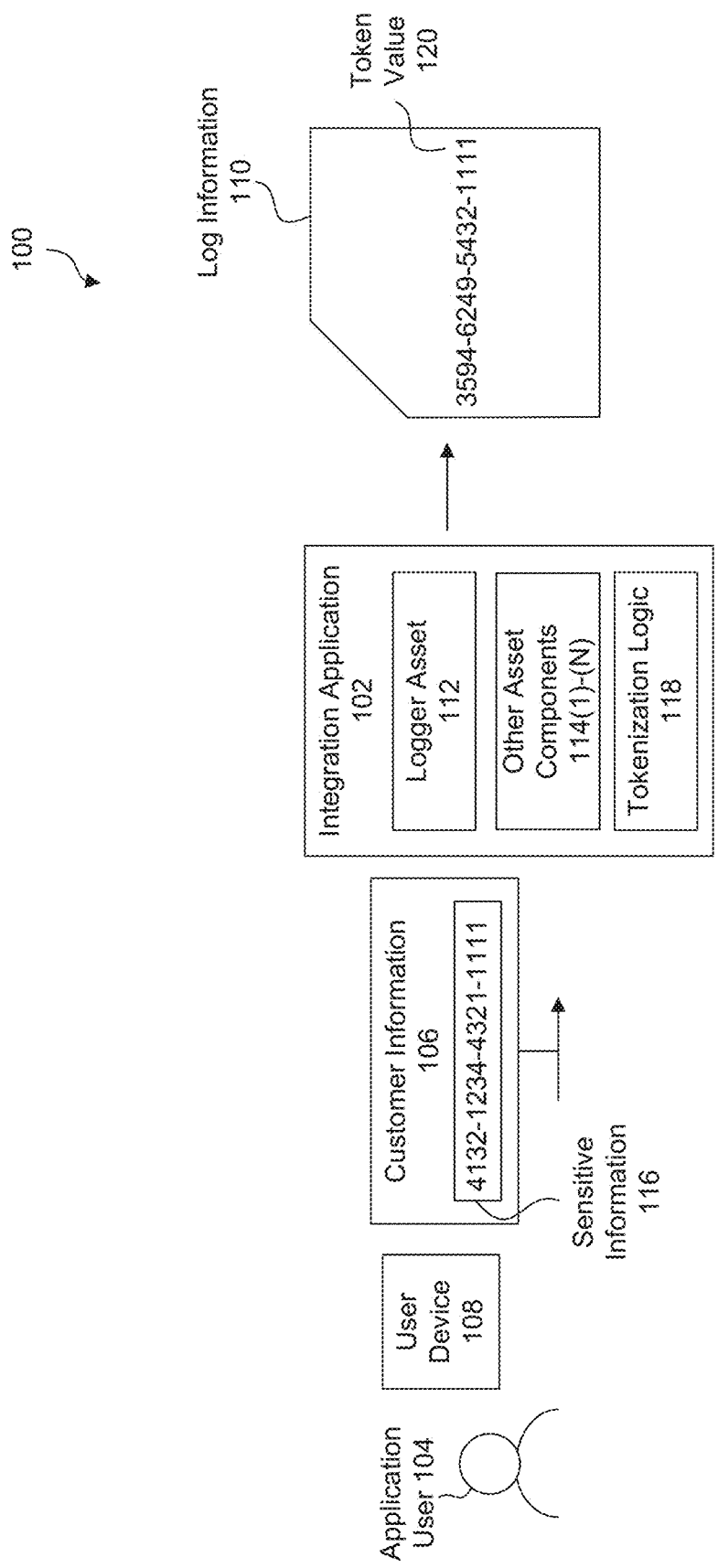
FIG. 1 is a block diagram of an example framework for implementing log tokenization in an integration platform system, according to some embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for implementing log tokenization in an integration application on an integration platform.

FIG. 1 is a block diagram of an example framework for implementing log tokenization in an integration platform system, according to embodiments of the present disclosure. As illustrated in FIG. 1, an integration platform system 100 may include an integration application 102 developed on an integration platform. Further, the integration application 102 may provide one or more software functions to a user 104. For instance, the integration application 102 may provide customer relationship management functionalities. As an example, the integration application 102 may be configured to implement a process flow for receiving customer information 106 from a user device 108, and generating log information 110 including the customer information 106.

As used herein, and in some embodiments, an "integration platform" may refer to a software platform that may be employed to integrate a plurality of software applications and/or services. In some examples, the integration platform may incorporate at least one of an enterprise service bus (ESB) architecture, micro-service architecture, or service oriented architecture (SOA). As used herein, and in some embodiments, an "integration application" may refer to an application developed using an integration platform. For instance, the integration application may include one or more pre-built components of the integration platform. In addition, the integration application may be declaratively developed using an integration-application design tool of the integration platform, deployed within a runtime environment of the integration platform, and/or executed within an integration platform as a service (iPaaS).

As used herein, and in some embodiments, "a process flow" may be a construct within which a developer links together several individual assets to handle the receipt, processing, and eventual routing of a message. Further, a developer may connect process flows together to build an integration application that may be deployed within an runtime environment. As described herein, a process flow may include one or more assets or process sub-flows, and define a single repeatable process within the integrated application. In some embodiments, process flow and process sub-flows are integration application components for grouping together a sequence of assets and/or operations to help automate integration processes.

Each asset of a process flow receives an input message, carries out a specific function, and then transfers an output message to the next component (e.g., the next asset) of the process flow. As such, the placement and order of assets within a process flow determines the functionality of the corresponding integration application. In some embodiments, an integration application may be a single process flow, or a collection of discrete process flows and process sub-flows that interact with each other. For instance, an integration application may implement multiple process flows and process sub-flows to divide an integration application into functional modules and/or for error-handling purposes.

As illustrated in FIG. 1, the integration application 102 may include a logger asset 112 for generating the log information 110 based at least in part on the customer information 106, and one or more other asset components 114(1)-(N) for processing the customer information 106 received from the user device 108. For example, the one or more asset components 114(1)-(N) may receive the customer information 106, and provide the customer information 106 to the logger asset 112.

As used herein, in some embodiments, "log information" may include a record of loggable events or loggable contexts associated with the execution of an application (e.g., the integration application 102). Further, the log information 110 may be analyzed by a platform user (e.g., an administrator or a developer) to identify application issues and/or investigate application failure. As used herein, and in some embodiments, a "loggable event" may be an identifiable action or occurrence recognized by the integration application. In addition, as used herein, and in some embodiments, a "loggable context" may be a state of an integration application. In some embodiments, the state of an integration application may include variable information, constant information, scope information, stack information, trace flow information, debug information, version information, etc.

In some instances, the logger asset 112 may determine that the customer information 106 includes sensitive information 116. In some embodiments, as described in detail herein, the logger asset 112 may determine that the customer information 106 includes sensitive information 116 based on at least one of employing machine learning techniques or pattern recognition techniques, log policy information associated with the logger asset 112, configuration information associated to with the logger asset 112, message information associated with the customer information 106, or identification information accompanying the customer information 106. Some examples of sensitive information 116 include personally identifiable information, account information, authentication verifiers (e.g., passwords, secrets, keys, etc.), medical information, payment card information, financial account information, device identifiers, internet protocol (IP) addresses, media access control (MAC) addresses, electronic mail addresses, telephone numbers, serial numbers, certificate/license numbers, insurance information, birth dates, social security numbers, etc. Further, a platform user may not need access to the sensitive information 116 to identify application issues or investigate application failure. Further, exposing the sensitive information 116 to platform users may increase the risk of fraud/identity theft or denial of services attacks, or violate governmental regulations concerning personally identifiable information, financial information, medical records, and/or data privacy.

Therefore, the logger asset 112 may be configured to tokenize the sensitive information 116 prior to logging the customer information 106 as log information 110. As used herein, and in some embodiments, "tokenizing" or "tokenization" refers to generating a token value mathematically independent from clear text data input (e.g., the sensitive information 116) based on application of a tokenization algorithm to the clear text data input. In some embodiments, the tokenization algorithm may preserve a format of the clear data input. Further, in some embodiments, the tokenization algorithm may preserve a difference between the format of the clear data input and an expected format of the clear data input.

Referring to FIG. 1, the logger asset 112 may employ tokenization logic 122 to determine a token value 120 corresponding to the sensitive information 116. Further, the logger asset 112 may log the token value 120 within the log information 110 in lieu of the sensitive information 116. Additionally, or alternatively, the logger asset 112 may stream the token value 120, in lieu of the sensitive information 116, within the log information 110 to a management application that displays the log information 110 to a platform user.

By substituting the sensitive information 116 with the token value 120, the logger asset 112 preserves the ability of the log information 110 to provide an informative record for analyzing execution of the integration application while reducing the risks of fraud and/or failing to abide by government regulations concerning the protection of the sensitive information 116. For example, as illustrated in FIG. 1, the tokenization logic 122 preserves attributes (e.g., the format, characters, invalid characters, etc.) of the sensitive information 116, thereby allowing a platform user to subsequently deduce the type of the sensitive information 116 provided by the user 104 without compromising the sensitive information 116.

In some embodiments, the tokenization logic 122 may determine that the customer information 106 includes the sensitive information 116. Further, the tokenization logic 122 may send the sensitive information 116 to a tokenization service that generates the token value 120, and receive the token value 120 from the tokenization service. In addition, the tokenization logic 122 may provide the token value 120 to the logger asset 112 to be logged as log information 110. In some other embodiments, the tokenization logic 122 may send the customer information 106 to the tokenization service without determining that the customer information 106 includes sensitive information 116. Further, the tokenization logic 122 may perform a bulk tokenization process in which the tokenization logic 122 performs tokenization without identifying the sensitive information 116 within the customer information 106. In yet still some other embodiments, the tokenization logic 122 may be configured to determine that the customer information 106 includes the sensitive information 116, generate the token value 120 based on the sensitive information 116, and provide the token value 120 to the logger asset 112.

Figure 2:
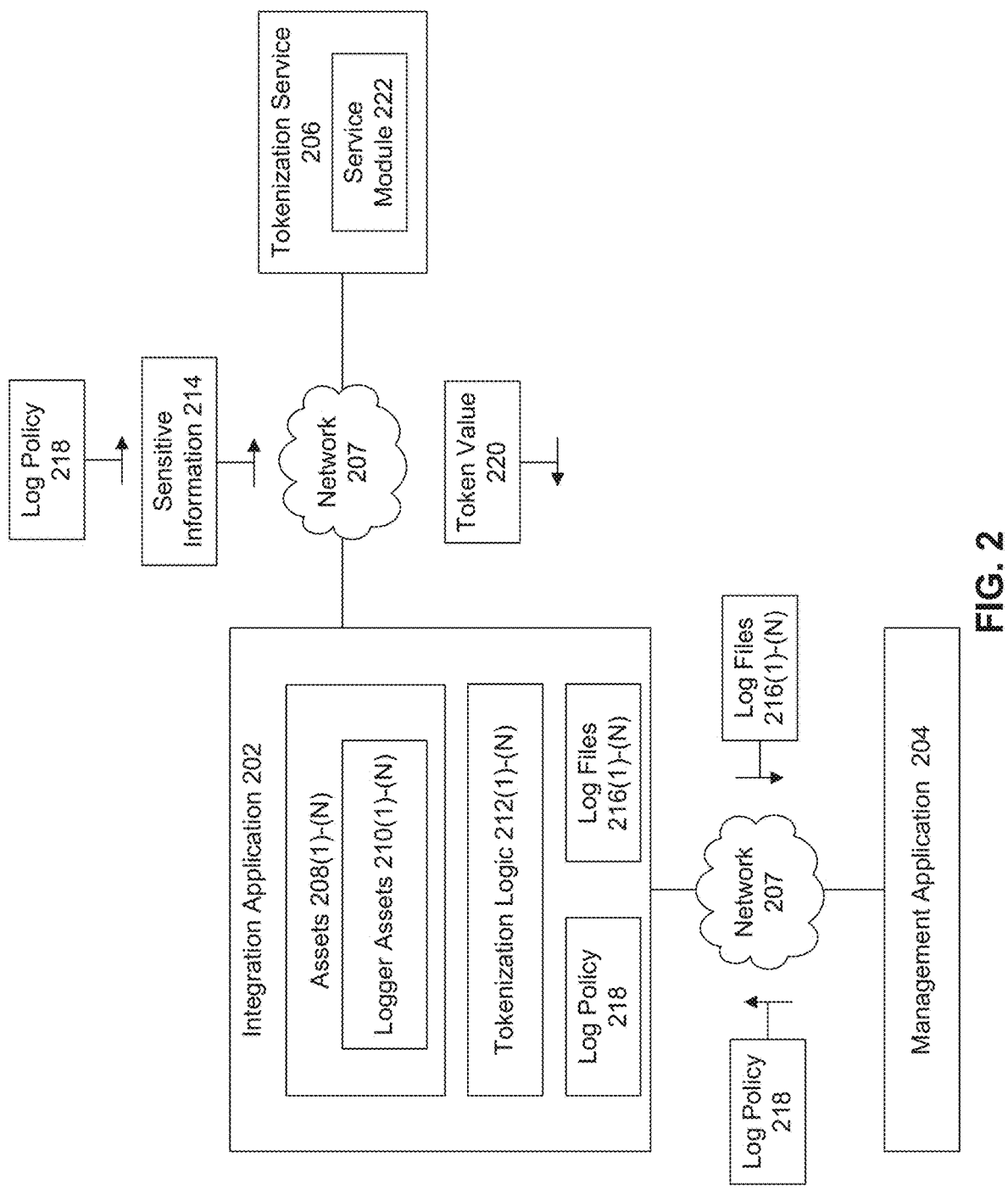
FIG. 2 is a block diagram of an example framework for implementing log tokenization in an integration platform system, according to some embodiments.

FIG. 2 is a block diagram of an example framework for implementing log tokenization in an integration platform system, according to some embodiments. As illustrated in FIG. 2, the integration platform system 200 includes an integration application 202, a management application 204, a tokenization service 206, and one or more communication networks 207. In some embodiments, the integration application 202, the management application 204, and the tokenization service 206 may communicate via the communication network(s) 207. Further, the communications network(s) 207 may include any or all of a private network, personal area network (PAN), Local-Area Network (LAN), a Wide-Area Network (WAN), or the Internet.

The integration application 202 may include a plurality of assets 208(1)-(N). As described in detail herein, the plurality of assets 208(1)-(N) may be declaratively configurable components that combine to implement the functionality of the integration application 202. Further, the plurality of assets 208(1)-(N) may include one or more logger assets 210(1)-(N) associated with tokenization logic 212(1)-(N) for preventing logging of sensitive information 214 to the log files 216(1)-(N) generated by the integration application 202.

In some embodiments, an asset 208(1) may be a logger asset 210(1) including tokenization logic 212(1). In some other embodiments, the asset 208(1) may be a logger asset 210(1) and the tokenization logic 212(1) may be a separate asset having a connection to the logger asset 210(1). In yet still some other embodiments, an asset 208(1) may be pre-configured with the functionality of a logger asset, as described in more detail in co-pending application "Codeless Logging In An Integration Platform," which is incorporated by reference herein in its entirety. Further, the pre-configured functionality may include tokenization logic for preventing the asset 208(1) from logging the sensitive information 214 to the log files 216(1)-(N).

As an example, the integration application 202 may provide customer relationship management functionalities. Further, the integration application 202 may be configured to receive a customer information request via the asset 208(1), query a database for the customer information based on a customer identifier via the asset 208(2), log the customer information request and the requested information to the log file 216(1) via the logger asset 210(1), prepare a payload message including the requested customer information via the asset 208(3), and send the payload message to the requestor via the asset 208(4).

In addition, the logger asset 210(1) may employ the tokenization logic 212(1) to prevent the sensitive information 214 from being recorded within the log file 216(1). For instance, the logger asset 210(1) or tokenization logic 212(1) may determine that the customer information request includes sensitive information 214. In response to determining that the customer information request or requested information includes the sensitive information 214, the tokenization logic 212(1) may send the sensitive information 214 to the tokenization service 206 via the communication network 207. In some embodiments, the logger asset 210(1) or tokenization logic 212(1) may determine that the customer information request includes the sensitive information 214 based on a log policy 218. For example, the log policy 218 may identify the types of data that should be tokenized and prevented from being logged within the log file 216(1). Upon receipt of the sensitive information 214, the tokenization service 206 may generate a token value 220 based on applying a tokenization algorithm to the sensitive information 214, and send, via the communication network 207, the token value 220 to the logger asset 210(1) for recordation in the log file 216(1).

As used herein, and in some embodiments, a "management application" may refer to an application or service for managing and/or monitoring execution of an integration application. In some embodiments, the management application 204 may permit a platform user to view the log information recorded in the log files 216(1)-(N). For example, the integration application 202 may stream the log files 216(1)-(N) to the management application 204 via the communication network 207, and the management application 204 may include a GUI for presenting the contents of the log files 216(1)-(N) to a platform user. Further, the management application 204 may permit a platform user to dynamically modify application attributes and/or application settings during execution of the integration application 202. For example, a platform user may configure and/or update the log policy 218 via the management application 204.

In some embodiments, the log policy 218 may identify types of information to flag as the sensitive information 214. For instance, the log policy 218 may include an identifier, an attribute, a format, or a description of the sensitive information 214 that may be used to identify the sensitive information 214. Further, the log policy 218 may include instructions for generating the token value 220. In some embodiments, the log policy 218 may include settings for determining the format of the token value 220 generated by the tokenization service 206. In some instances, the log policy 218 may include settings indicating one or more attributes of the sensitive information 214 to preserve throughout the tokenization process performed by the tokenization service 206.

In some instances, the log policy 218 may configure the tokenization service 206 to preserve a particular amount of characters or digits of the sensitive information 214 when generating the token value 220. Additionally, or alternatively, the log policy 218 may configure the tokenization servicer 206 to preserve characters or digits at particular locations of the sensitive information 214 when generating the token value 220. For example, the log policy 218 may configure the tokenization service 206 to preserve the last four digits of a credit card number. As another example, the log policy 218 may configure the tokenization service 206 to preserve the last four digits of a social security number. In yet still some other instances, the log policy 218 may configure the tokenization service 206 to preserve particular characters or information of the sensitive information 214 when generating the token value 220. For example, the log policy 218 may configure the tokenization service 206 to preserve the at sign symbol (i.e., "@") within an email address or the period characters within an IP address.

As illustrated in FIG. 2, once the user determines the log policy 218 via the management application 204, the management application 204 may send the log policy 218 to the integration application 202 and/or the tokenization service 206. Upon receipt of the log policy 218, the integration application 202 may use the log policy 218 to identify the sensitive information 214. Further, upon receipt of the log policy 218, the tokenization service 206 may generate the token value 220 based on the log policy 218.

In addition, the tokenization service 206 may include a service module 222 configured to perform the tokenization algorithm. For instance, the service module 222 may be configured to identify the sensitive information 214 and/or generate the token value 220. In some embodiments, the service module 222 may employ machine learning techniques and/or pattern recognition techniques to identify the sensitive information 214 and/or generate the token value 220. For example, the service module 222 may include hidden Markov models, decision trees, regression models, support vector machines, or artificial neural networks for identifying the sensitive information 214 and/or generating the token value 220. Further, the machine learning techniques and/or pattern recognition techniques may identify the sensitive information 214 and/or generate the token value 220 based at least in part on the log policy 218. For instance, a machine learning model of the service module 222 may employ features associated with the configuration settings of the log policy 218. Additionally, or alternatively, one or more functions of the service module 222 may be performed by the logger assets 210(1)-(N).

In addition, in some instances, the service module 222 may be configured to preserve the shape of the sensitive information 214 when generating the token value 220. As used herein, and in some embodiments, "shape" may refer to the format, length, attributes, validity, characteristics, digits, symbols, language, style, appearance, order, or arrangement of the sensitive information 214. For example, the service module 222 may determine that the sensitive information 214 is a sixteen digit credit card number with a space after every $4^{th}$ digit. Further, the service module 222 may generate the token value 220 as a sixteen digit value with a space every $4^{th}$ digit. However, the digits of the sensitive information 214 may be different from the digits of the token value 220. As another example, the service module 222 may determine that the sensitive information 214 is an invalid social security number as one of the nine characters is an alphabetic letter. Further, the service module 222 may generate the token value 220 as a value having a similar format as a social security number. However, the token value 220 may also be an invalid social security number as it includes an alphabetic character while otherwise having the format of a social security number. As such, the platform user may be able to identify that the end-user provided invalid user input while still protecting the sensitive information 214. Additionally, or alternatively, the service module 222 may employ one or more tests to evaluate the validity of the token values 220. For example, the service module 222 may perform a luhn test to determine the validity of a credit card number.

Figure 3A:
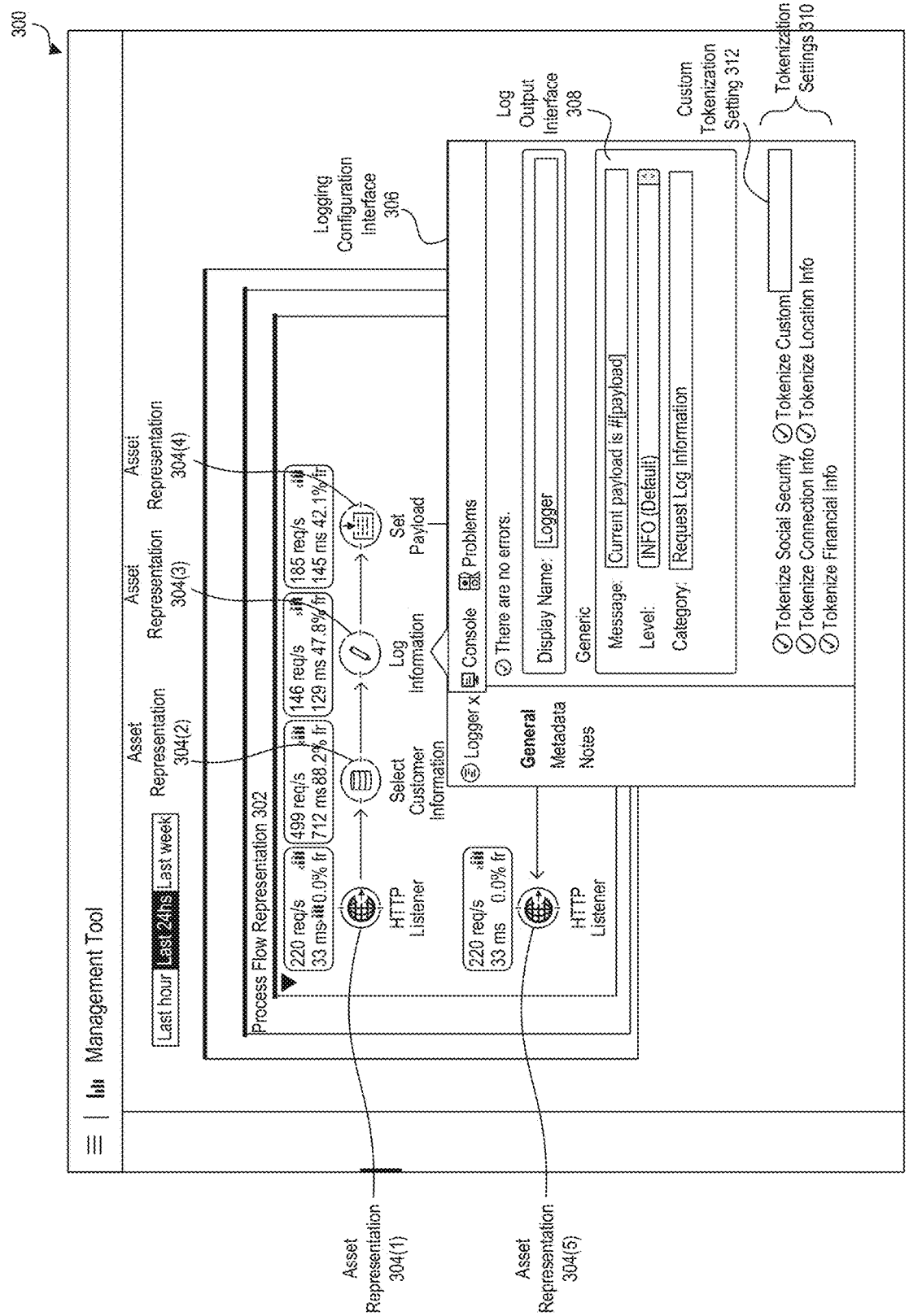
FIGS. 3A-3B illustrate an example graphical user interface (GUI) of a management tool for implementing log tokenization on an integration platform, according to some embodiments.

FIG. 3A illustrates an example graphical user interface (GUI) of a management application for implementing log tokenization in an integration platform, according to embodiments of the present disclosure.

The management application may display application attributes, application settings (e.g., log policy settings), application details, performance metrics, and/or application activity (e.g., log information) in near-real time or real-time via the GUI 300. In addition, the management application may display historic application attributes, historic application details, and/or historic application activity via the GUI 300. Further, the management application may permit a user to dynamically modify application attributes and/or application settings during execution of an integration application associated with the monitoring application.

Suppose the management application presents the GUI 300 with respect to an integration application that provides customer relationship management functionalities. For instance, the integration application may be configured to receive a customer information request, query a database for the customer information based on an identifier included in the request, log request information corresponding to the customer information request, prepare a payload message including the requested customer information, and send the payload message to the requestor. The management application may be configured to display one or more process flows of the integration application, and permit a platform user to enable or disable dynamic log tokenization with respect to operations performed by the assets of the one or more process flows during execution of the integration application.

As illustrated in FIG. 3A, the GUI 300 may include a flow representation 302. Although a single flow representation 302 is shown in FIG. 3A, the embodiments described herein are applicable to any number of flow representations. Further, each flow representation 302 may correspond to a process flow within the integration application. In some embodiments, the flow representations 302 may depict the process flows, process sub-flows, and/or assets of an integration application. For example, the flow representation 302 may correspond to the process flow for requesting customer information from the integration application. In addition, the flow representation 302 may include one or more assets representations 304 corresponding to the assets of the process flow.

For instance, the process flow representation 302 may include the assets representations 304(1)-(5). Although asset representations 304(1)-(5) are shown in FIG. 3A, the embodiments described herein are applicable to any number of asset representations. The asset representation 304(1) may correspond to a HTTP endpoint asset configured to receive a HTTP request for customer information, the asset representation 304(2) may correspond to an asset configured to query a customer database for customer information based on an customer identifier included in the HTTP request, the asset representation 304(3) may correspond to an asset configured to log request information corresponding to the customer information request, the asset representation 304(4) may correspond to an asset configured to set the payload of a message to include the customer information, and the asset representation 304(5) may correspond to a represent a HTTP endpoint configured to send a HTTP response including the message. In some embodiments, the asset representation 304(1) and the asset representation 304(5) may correspond to the same HTTP endpoint.

In addition, the GUI 300 may present a logging configuration interface 306. In some embodiments, a user of the monitoring application may select an asset representation 304 via the GUI 300, and the GUI 300 may present the logging configuration interface 306 in response to the selection. For instance, the user may select the asset representation 304(3) via an input device (e.g., a mouse, a keyboard, touch screen interface, etc.) and present the logging configuration interface 306 with respect to the asset representation 304(3).

Further, the logging configuration interface 306 may include a log output interface 308 and tokenization settings 310. As illustrated in FIG. 3A, the log output interface 308 may include a text input field that allows a platform user to configure the content and/or format of log output generated by the logger asset corresponding to the asset representation 304(3), a log level of the log output, and a category of the log output. In some embodiments, the text input field may be configured to access information (e.g., message fields, a message payload, message attributes, etc.) of incoming messages and/or outgoing messages of the logger asset corresponding to the asset representation 304(3). Some examples of log levels include ALL, DEBUG, INFO, WARN, ERROR, FATAL, OFF, and TRACE. Further, the category of the log output may be used to group the log output with other log output.

In some embodiments, the logger asset may be configured to tokenize sensitive information. For instance, in response to a platform user selecting a type of sensitive information to tokenize via the tokenization settings 310, the management application may cause the logger asset to replace sensitive information of the selected type of sensitive information with a token value within the log message content set forth in the log output interface 308. In some other instances, in response to a platform user deselecting a type of sensitive information to tokenize via the tokenization settings 310, the management application may cause the logger asset to abstain from replacing sensitive information of the deselected type of sensitive information with a token value within the message content set forth in the log output interface 308.

As illustrated in FIG. 3A, the logging configuration interface 306 may present different types of sensitive information with a selectable and deselectable graphical control element (e.g., radio button, checkbox, slider control, drop-down list, etc.) for enabling or disabling tokenization by a logger asset in accordance with the tokenization settings 310 prior to or during execution of the integration application. Additionally, the tokenization settings may include a custom tokenization setting 312 for receiving platform user input identifying a type of application data to tokenize. In some embodiments, the user input may include a regular expression identifying a type of application data to tokenize or other examples of the type of application data to tokenize. For instance, the platform user may provide training data that may be used to train a machine learning model to determine a type of application data to tokenize.

As an example, the platform user may enter textual input that sets the content of a log message logged by the logger asset corresponding to the asset representation 304(3) to the payload of an incoming message received from the asset corresponding to the asset representation 304(2). In some instances, the payload may include query results of a database query performed by the asset corresponding to the asset representation 304(2) for customer information associated with a customer identifier. In addition, the platform use may set the level of the log message to INFO, and the category of the log message to "Request Log Information." Further, the platform user may select the graphical control element corresponding to tokenization of social security numbers, and the graphical control element corresponding to tokenization of financial information.

As a result, the management application may send the user input as configuration information (i.e., log policy) to the integration application. In response, the integration application may dynamically update the logger asset corresponding to the asset representation 304(3) in accordance with the configuration information. For instance, the asset corresponding to the asset representation 304(2) may perform a database query with query results including a social security number of a customer and a credit card number of the customer. Further, the database asset corresponding to the asset representation 304(2) may generate a message with a payload including the social security number and the credit card number, and send the message to the logger asset corresponding to the asset representation 304(3). In response, the logger asset may generate log information with token values replacing the social security number and the credit card number as described in detail herein, and record the log information to a log file or stream the log information to the management application.

Figure 3B:
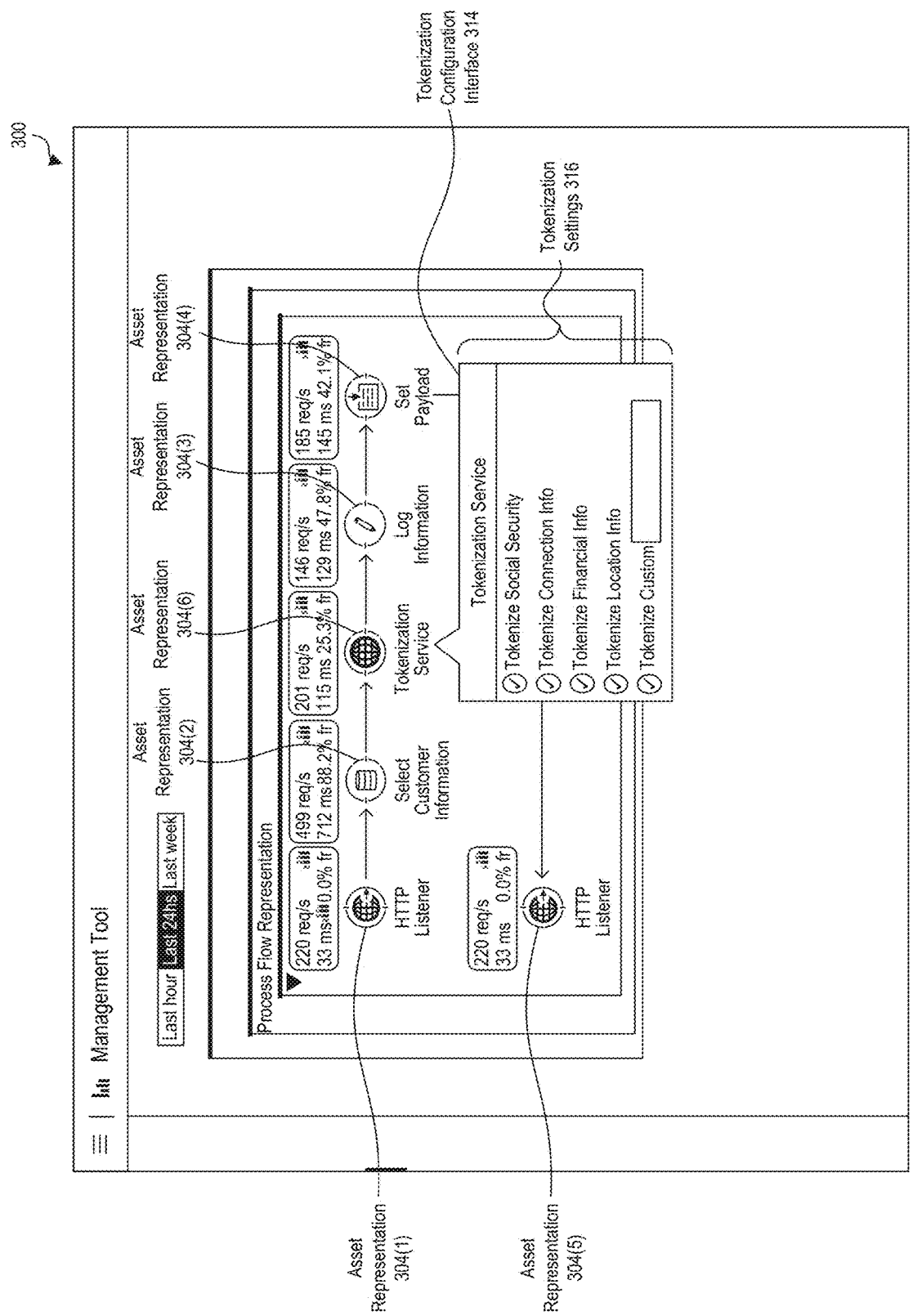

FIG. 3B illustrates an example graphical user interface (GUI) of a management application for implementing log tokenization in an integration platform, according to embodiments of the present disclosure.

Referring to FIG. 3B, in some embodiments, the tokenization logic may be separate from the logger asset. As such, the flow representation 302 may include an additional asset representation 304(6) corresponding to a tokenization asset. As illustrated in FIG. 3B, the asset representation 304(6) may be placed in the flow representation prior to the logger asset to indicate that the sensitive information may be tokenized prior to the generation of logging information by a logger asset associated with the asset representation 304 (3).

Further, as described in detail above, the GUI 300 may present the logging configuration interface 306 in response to selection of the asset representation 304(6). For instance, the user may select the asset representation 304(6) via an input device (e.g., a mouse, a keyboard, touch screen interface, etc.) and present the logging configuration interface 314 with respect to the asset representation 304(6). Additionally, the platform user may select and deselect the tokenization settings 316 for enabling or disabling tokenization by a logger asset in accordance with the tokenization settings 316 prior to or during execution of the integration application.

For example, in response to a platform user selecting a type of sensitive information to tokenize via the tokenization settings 316, the management application may cause the logger asset to replace sensitive information of the selected type of sensitive information with a token value within the message content set forth in the log output interface 308. As another example, in response to a platform user deselecting a type of sensitive information to tokenize via the tokenization settings 316, the management application may cause the logger asset to abstain from replacing sensitive information of the deselected type of sensitive information with a token value within the message content set forth in the log output interface 308.

Figure 4A:
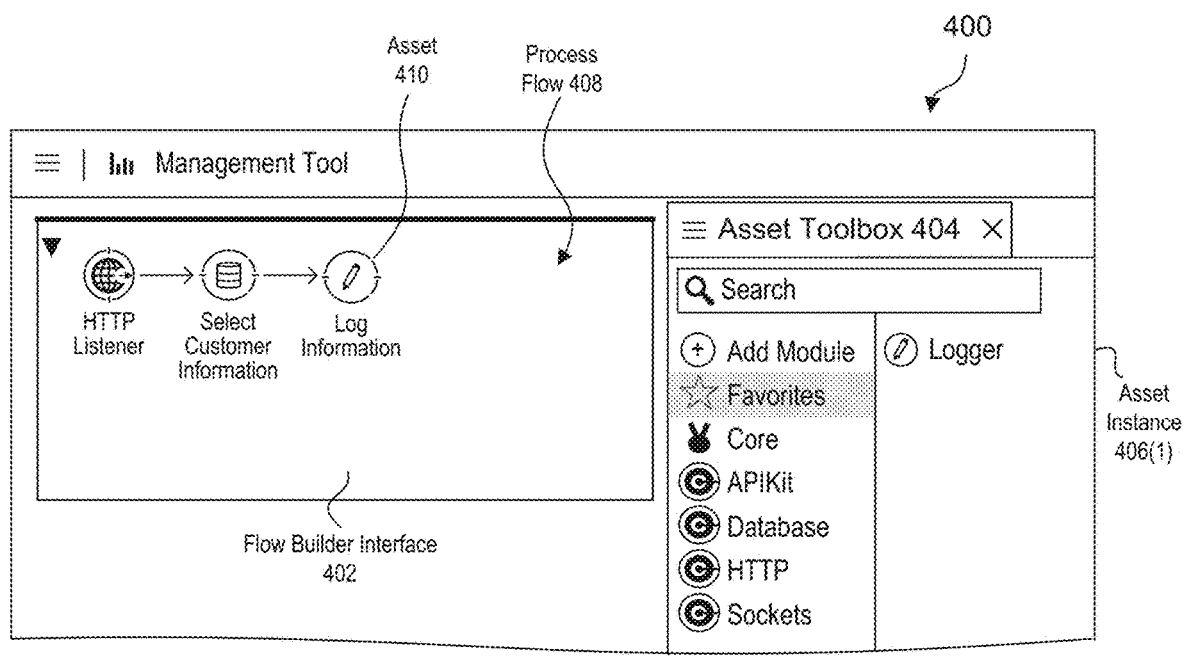
FIGS. 4A-4C illustrate an example graphical user interface of an integration-application design tool for declaratively programming an integration application with log tokenization on an integration platform, according to some embodiments.
Figure 4B:
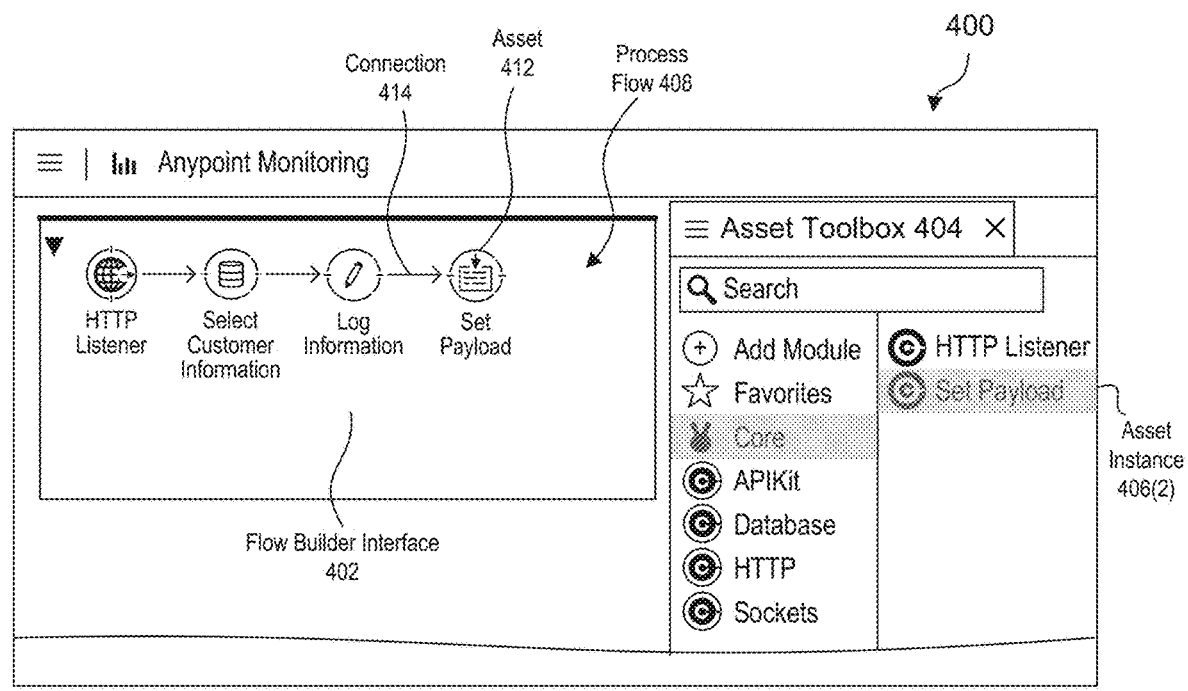
Figure 4C:
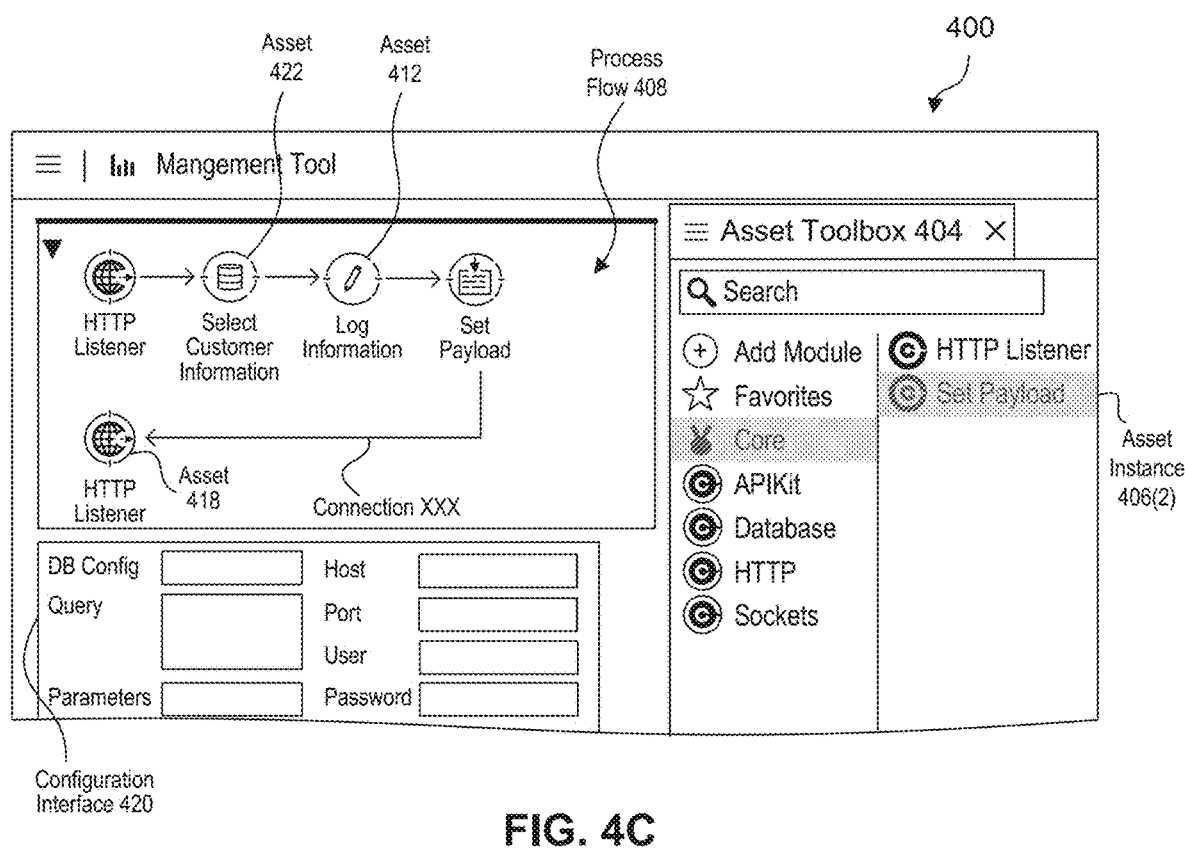

FIGS. 4A-4C illustrate an example GUI 400 of an integration-application design tool for declaratively programming an integration application with log tokenization, according to embodiments of the present disclosure. In some embodiments, an integration-application design tool and a monitoring application may be separate features of the same application. In some other embodiments, the integration-application design tool and the monitoring application may be separate applications executing within the same computing environment or different computing environments.

As illustrated in FIG. 4A, the GUI 400 may include a flow builder interface 402 and asset toolbox 404 containing a plurality of different asset type instances 406(1)-(N). In some embodiments, a developer may declaratively program a process flow 408 of an integration application within the flow builder interface 402. As used herein, and in some embodiments, "declarative programming" may refer to software development via a point and click, drag and drop interfaces, configuration wizards, and/or declarative language input (eXtensible Markup Language (XML), YAML Ain't Markup Language (YAML), Extensible Application Markup Language (XAML), or any other markup languages) to text input forms. For example, the developer may add an instance of the asset 406(1) from the asset toolbox 404 as the asset 410, and provide a title for the asset 410 within the process flow 408. In some instances, the developer may drag and drop the instance of the asset 406(1) from the asset toolbox 404 to the flow builder interface 402. In some other instances, the developer may use a configuration wizard or menu to add the instance of the asset 406(1) to the process flow 408 being constructed within the flow builder interface 402.

Suppose the process flow 408 corresponds to process within an integration application for a receiving a customer information request, querying a database for the customer information based on a customer identifier included in the request, logging request information corresponding to the customer information request, preparing a payload message including the requested customer information, and sending the payload message to the requestor. Referring to FIG. 4A, the asset 410 may be a logger asset for generating the log information corresponding to a customer information request. Further, as described in detail herein, the asset 410 may be configured to determine that the customer identifier includes sensitive information, and substitute the sensitive information with a token value within the log information.

As described in detail herein, the process flow 408 may include message sources and an arrangement of assets (e.g., the asset 410) that act as event-driven message processors. Further, the integration application may begin with processing a message received at an inbound message source of the process flow 408. In response to receipt of the message, the assets of the process flow 408 may be configured to receive a message and generate a response. In some embodiments, a message source may translate a particular communication protocol or method into a standard message format, which is then passed down to the assets of the process flow. Process flows may also use assets to make outbound client requests to other external resources, services, and/or applications.

Some examples of assets include connector assets, scope assets, component assets, transformer assets, filter assets, flow control assets, and error handling assets. Connector assets may be configured to create a direct connection between an integration application and an external resource (e.g., a database, a File Transfer Protocol server, etc.). Component assets may execute whenever a message is received. In some embodiments, a component asset may be a general component asset (e.g., a logger asset), a script component asset, or a web service component asset. Script component assets may facilitate Software as a Service (SaaS) integration by providing language-specific execution shells for performing custom-coded business logic. Web service component assets may provide a developer with a framework for referencing classes and API's needed by RESTful and SOAP Web services.

Scope assets may provide advanced processing, such as asynchronous invocations, polling, sub flows, etc. Transformer assets may be configured to translate data from a first format to a second format. Filter assets may be configured to determine how messages proceed thru a process flow. Flow control assets may be configured to route messages to other flows or an external service. Error handling assets may be configured to manage software exceptions that arise during processing of a message by a process flow.

As illustrated in FIG. 4B, the developer may add an instance of the asset 406(2) from the asset toolbox 404 as the asset 412, and provide a title for the asset 412 within the process flow 408. In some instances, the developer may drag and drop the instance of the asset 406(2) from the asset toolbox 404 to the flow builder interface 402. In some other instances, the developer may use a configuration wizard or menu to add the instance of the asset 406(2) to the process flow 408 being constructed within the flow builder interface 402.

Upon receipt of the asset 412, the flow builder interface 402 may be configured to automatically create a connection 414 (i.e., message channel) between the asset 410 and the asset 412. Additionally, or alternatively, the integration-application design tool may provide an declarative interface for manually adding and/or configuring a connection between the asset 410 and the asset 412. Further, the flow builder interface 402 may be configured to program the asset 410 to generate a message, and pass the message to the asset 412 for further processing. As further illustrated in FIG. 4B, the asset 412 may be a set payload transformer component configured to set the payload of a generated message to the requested customer information corresponding to the customer identifier.

As illustrated in FIG. 4C, the user may employ the flow builder interface 402 to create a connection 416 between the asset 412 and the asset 418. Further, the flow builder interface 402 may be configured to program the asset 412 to generate a message, and pass the message to the asset 418 via the connection 416 for further processing. For example, the asset 412 may send a message to the asset 418 with a payload including customer information. In response, the asset 418 may send an HTTP response including the customer information to a requestor entity.

Further, the GUI 400 may include a configuration interface 420 for configuring the process flow 408. In some embodiments, the configuration interface 420 may be configured to accept declarative input from the developer with respect to the assets (e.g., the asset 410, the asset 412, and the asset 416), and/or the connections between the assets. For example, the configuration interface 420 may receive declarative input from a developer that configures the asset 422 to select the customer information from a particular database. In some instances, the configuration interface 420 may present different configuration fields based upon the type of asset. For example, the configuration interface 420 may include input fields for a display name, query text, input parameters, and/or connector configuration information for a structured query language (SQL) connector asset. As another example, the configuration interface 420 may present an interface for configuring tokenization as described in detail herein (e.g., tokenization settings 310, tokenization policy interface 602, data domain management interface 604, etc.) with respect to asset 410.

In some embodiments, the integration-application design tool may generate a configuration file at least partially in response to declarative input to the flow builder interface 402 and other interfaces of the integration-application design tool. Additionally, or alternatively, the developer may design the integration application within the integration-application design tool by hand. Further, the integration-application design tool may generate the configuration file in one or more computer languages. Some examples computer languages include eXtensible Markup Language (XML), YAML Ain't Markup Language (YAML), RESTful API Modeling Language (RAML), DataWeave, JavaScript Object Notation (JSON), Bash, Python, Lua, Beanshell, JavaScript, Perl, Ruby, and Tcl, JavaScript, Hyper Text Markup Language (HTML), HTML5, BASIC, C, Lisp, Lua, Python, Ruby, Java, Groovy, C, C++, C #, Visual Basic, Objective-C, Rust, Scala, etc.

Once the developer has completed development of the integration application, the integration-application design tool may package the integration application into a deployable file. The deployable file may include application code, configuration information, and dependencies. In some embodiments, the integration-application design tool may package the integration application into a self-contained Java ARchive (JAR) file. Further, the deployable file may be deployed to a runtime environment to execute the integration application. In some embodiments, the deployable file may be deployed into a cloud environment or an on premises server.

Figure 5:
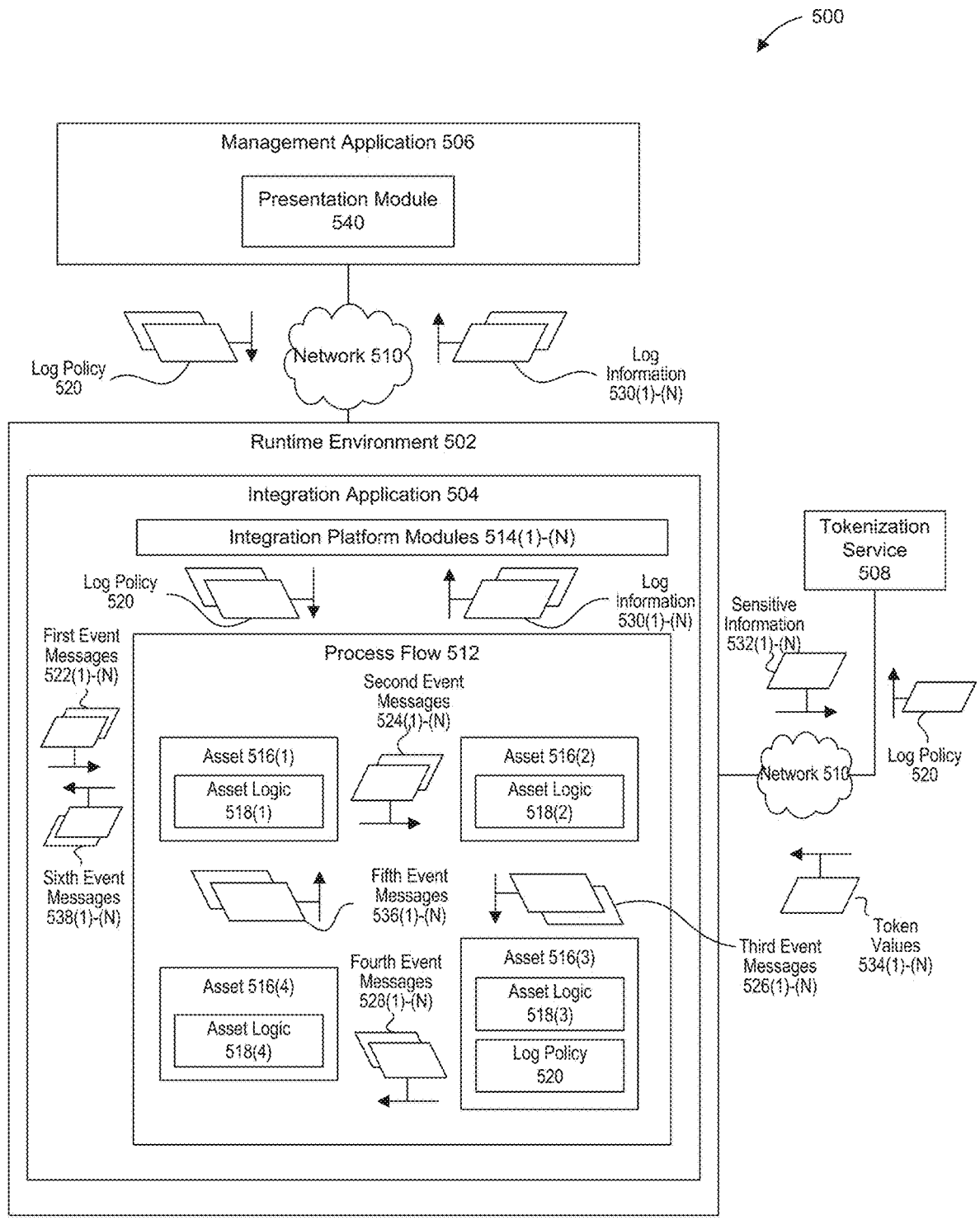
FIG. 5 is a block diagram of an example framework for implementing log tokenization in an integration platform system, according to some embodiments.

FIG. 5 is a block diagram of an example framework for implementing log tokenization in an integration platform system 500, according to some embodiments. As illustrated in FIG. 5, the integration platform system 500 includes a runtime environment 502 executing an integration application 504, a management application 506, and a tokenization service 508.

Further, the integration application 504, the management application 506, and the tokenization service 508 may communicate via a communication network(s) 510. The communication network 510 may include any combination of a private network, personal area network (PAN), Local-Area Network (LAN), Wide-Area Network (WAN), or the Internet. Further, the connection between the integration application 504, the management application 506, or the tokenization service 508, and the communication network 510 may be a wireless connection (e.g., Bluetooth or other short range wireless technology, cellular, Wi-Fi connection, etc.), or a wired connection (e.g., Ethernet, universal serial bus (USB), etc.), or a combination thereof.

As illustrated in FIG. 5, the integration application 504 may include a process flow 512 and integration platform modules 514(1)-(N). Further, the process flow 512 may include a first asset 516(1), a second asset 516(2), a third asset 516(3), and a fourth asset 516(4). Although assets 516(1)-(4) are shown in FIG. 5, the embodiments described herein are applicable to any number of assets 516. Further, each of the assets 516 may include asset logic 518. For example, the first asset 516(1) may include first asset logic 518(1). Further, the asset 516(3) may be a logger asset that includes a log policy 520.

As described in detail herein, the process flow 512 may receive first event messages 522(1)-(N) and provide the first event messages 522(1)-(N) to the first asset 516(1) as requests. In response, the first asset 516(1) may process the first event messages 522(1)-(N) via the asset logic 518(1) to generate second event messages 524(1)-(N). For example, the first asset 516(1) may receive a first event message 522(1) (e.g., a HTTP request) with a payload including an identifier associated with a customer, and generate a second event message 524(1) including the identifier via the asset logic 518(1).

Further, the first asset 516(1) may forward the second event messages 524(1)-(N) to the second asset 516(2). Upon receipt of the second event messages 524(1)-(N), the second asset 516(2) may process the second event messages 524(1)-(N) via the asset logic 518(2) to generate third event messages 526(1)-(N). In addition, the second asset 516(2) may forward the third event messages 526(1)-(N) to the third asset 516(3). For example, the asset 516(2) may receive the second event message 524(1), and query a customer database for customer information based on the identifier included in the second event message 524(1) via the asset logic 518(2). In addition, the second asset 516(2) may generate a third event message 526(1) including the customer information and send the third event message 526(1) to the third asset 516(3) via the asset logic 518(2).

Upon receipt of the third event messages 526(1)-(N), the third asset 516(3) may process the third event messages 526(1)-(N) via the asset logic 518(3) to generate fourth event messages 528(1)-(N). For example, the asset 516(3) may receive the third event message 526(1) and generate log information 530(1)-(N) including the customer information. Further, the asset logic 518(3) may send the log information 530(1)-(N) to the integration platform modules 514(1)-(N), which may forward the log information 530(1)-(N) to the management application 506.

As described in detail herein, the asset logic 518(3) may include tokenization logic for preventing sensitive and/or confidential information within the customer information from being logged as the log information 530(1)-(N). In some embodiments, the asset logic 518(3) may determine that the customer information includes sensitive information 532(1)-(N). For example, the asset logic 518(3) may determine that the customer information 106 includes sensitive information 532(1)-(N) based on employing machine learning techniques or pattern recognition techniques to the customer information. Additionally, the asset logic 518(3) may determine that the customer information includes sensitive information 532(1)-(N) based on identifiers or metadata associated with the third event messages 526(1)-(N), or the log policy 520.

Further, the asset logic 518(3) may send the sensitive information 532(1)-(N) to the tokenization service 508, and receive token values 534(1)-(N) from the tokenization service 508 based on the sensitive information 532(1)-(N). Additionally, or alternatively, the asset logic 518(3) may determine the token values 534(1)-(N) based on the sensitive information 532(1)-(N). Further, the asset logic 518(3) may substitute the token values 534(1)-(N) for the sensitive information 532(1)-(N) when generating the log information 530(1)-(N).

In some other embodiments, the asset logic 518(3) may send the customer information to the tokenization service 508. In response, the tokenization service 508 may identify the sensitive information 532(1)-(N) within the customer information, generate token values 534(1)-(N) corresponding to the sensitive information 532(1)-(N), and send the token values 534(1)-(N) to the asset logic 518(3). Further, the asset logic 518(3) may substitute the token values 534(1)-(N) for the sensitive information 532(1)-(N) when generating the log information 530(1)-(N). In yet still some other embodiments, the asset logic 518(3) may send the customer information to the tokenization service 508. Upon receipt of the customer information, the tokenization service 508 may generate token values 534(1)-(N) corresponding to the customer information, and send the token values 534(1)-(N) to the asset logic 518(3). Further, the asset logic 518(3) may substitute the token values 534(1)-(N) for the sensitive information 532(1)-(N) when generating the log information 530(1)-(N).

In some examples, the asset logic 518(3) may determine the application information to log and/or the application information to tokenize based on the log policy 520. In some instances, the log policy 520 may be set via a log output interface (e.g., the log output interface 308). The log policy 520 may identify the content and/or format of the log information 530(1)-(N), and/or the application information that may include the sensitive information 532(1)-(N). In some embodiments, the log policy 520 may identify the application information to log as the log information 530(1)-(N) based on log points enabled by a platform user, as described in more detail in co-pending application "Codeless Logging In An Integration Platform," which is incorporated by reference herein in its entirety.

Further, the log policy 520 may identify the types of data that should be tokenized and prevented from being logged within the log information 530(1)-(N). For instance, the log policy 520 may include identifiers, attributes, format information, or a descriptions that may be used to identify different types of sensitive information during the tokenization process. Additionally, the log policy 520 may include settings for determining the format of the token values 534(1)-(N) generated to replace the sensitive information 532(1)-(N) within the logging information 530(1)-(N). In some instances, the log policy 520 may include settings indicating one or more attributes of different types of sensitive information 532(1)-(N) to preserve throughout the tokenization process.

Upon receipt of the fourth event messages 528(1)-(N), the fourth asset 516(4) may process the fourth event messages 528(1)-(N) via the asset logic 518(4) to generate fifth event messages 536(1)-(N). For example, the asset 516(4) may receive the fourth event message 528(1) and generate a fifth event message 536(1) having a payload including the customer information via the asset logic 518(4). For example, the asset logic 518(4) may generate a fifth event message 536(1) with a payload including the customer information, and send the fifth message 536(1) to the first asset 516(1). Further, the first asset 516(1) may send the sixth event message 538(1) (e.g., a HTTP response) to the sender of the first event message 522(1).

In some embodiments, the management application 506 may send the log policy 520 to the third asset 516(3) indicating whether to log a particular event and/or the types of application information to tokenize. In response to receipt of the log policy 520, the asset logic 518(3) may log events as the log information 530(1)-(N) while tokenizing sensitive information 532(1)-(N) to ensure the log information 530(1)-(N) does not include the sensitive information 532(1)-(N). Further, the third asset 516(3) may send the log information 530(1)-(N) to the integration platform modules 514(1)-(N), which may forward the log information 530(1)-(N) to the management application 506.

In some embodiments, the log policy 520 may be at least partially set during development of the process flow 512. For example, a developer may set the log policy 520 via an integration-application design tool during development. Additionally, or alternatively, the integration application 504 and/or the management application 506 may dynamically update the log policy 520. Further, as described in detail herein, the asset logic 516(3) may be at least partially determined by an integration-application design tool during development. For example, the asset logic 516(3) may be generated based at least in part on input to a flow builder interface (e.g., the flow builder interface 402) of an integration-application design tool during development.

Upon receipt of the log information 530(1)-(N), at least one of the integration platform modules 514(1)-(N) may send the log information 530(1)-(N) to the management application 506. In some embodiments, the integration platform modules 514(1)-(N) may stream the log information 530(1)-(N) to the management application 506. Additionally, or alternatively, the asset logic 516(3) may store the generated log information 530(1)-(N) in a log file, and the integration platform modules 514(1)-(N) may provide access to the log file. Further, the integration platform modules 514(1)-(N) may provide integration libraries and services (e.g., routing services, a message broker, transaction management, transportation management, security, transformation, etc.) to the integration application 504 built on the integration platform.

Additionally, the management application 506 may be configured to present the log information 530(1)-(N) to a platform user via a presentation module 540. In some embodiments, the presentation module 540 may be configured to generate and display a GUI (e.g., the GUI 300) displaying graphical representation of the process flow 512 with the log information 530(1)-(N).

In some embodiments, the integration application 504 and the management application 506 may execute on the same computing system. Additionally, or alternatively, in some instances, the management application 506 and an integration-application design tool may execute on the same system or within the same application. As such, the log information 530(1)-(N) may be presented with a declarative software development interface (e.g., flow builder interface 402). For example, a process flow 408 depicted within the flow builder interface 402 may be displayed with log information 530(1)-(N) in order to provide a data driven development environment. In some other embodiments, the runtime environment 502 and the management application 506 may execute on separate systems. For example, the integration application 504 may send the log information 530(1)-(N) to the management application 506 via the communications network 510.

Figure 6A:
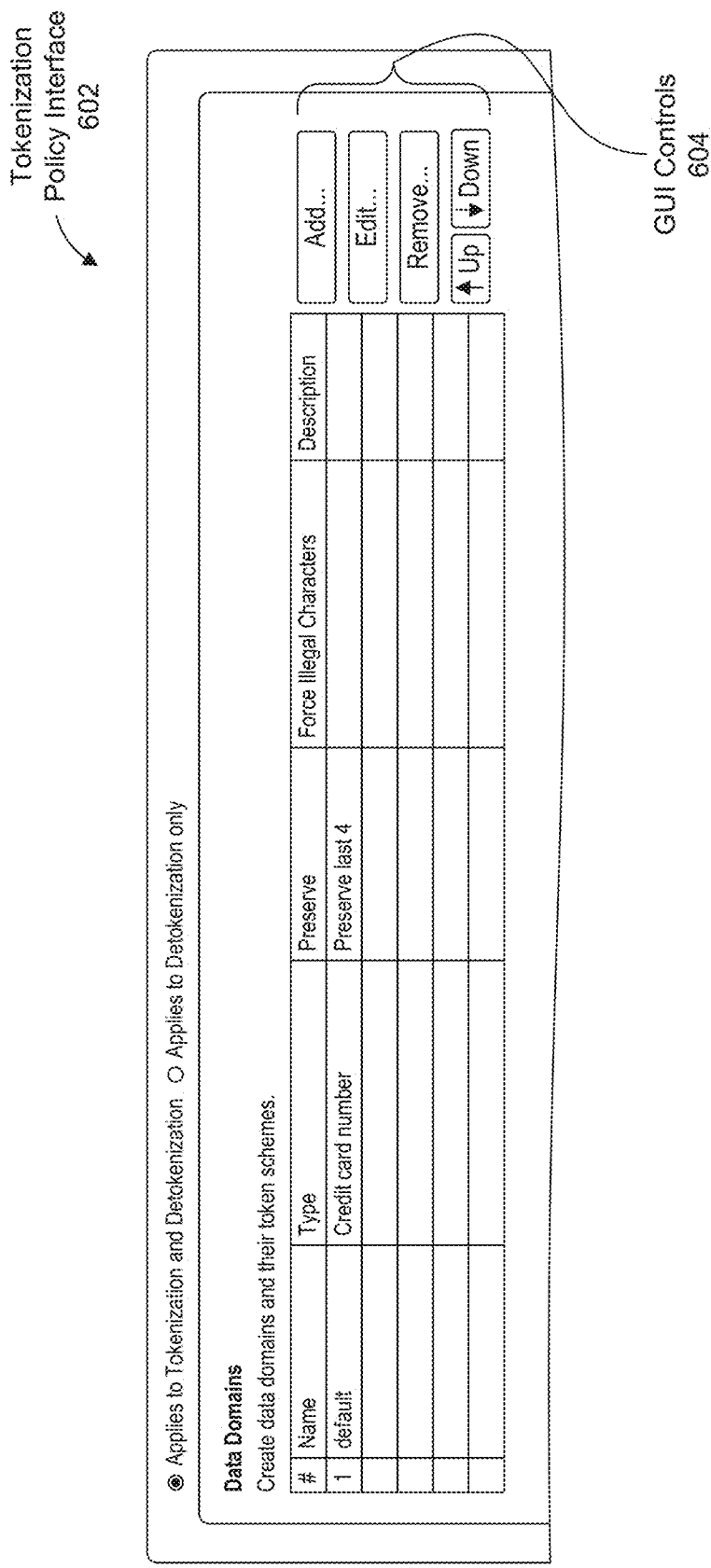

FIG. 6A illustrates an example graphical user interface (GUI) of a management application for setting a policy for log tokenization in an integration platform, according to embodiments of the present disclosure.

Referring to FIG. 6A, a management application may present a tokenization policy interface 602 for setting a policy for tokenization by a specific logger asset or globally for all of the logger assets of an integration platform. As illustrated in FIG. 6A, the tokenization policy interface 602 may include one or more GUI controls for creating, managing, and deleting data domains within a tokenization policy. As used herein, and in some embodiments, a "data domain" may refer to configuration information for a type of sensitive information. In particular, the tokenization policy interface 602 may include GUI controls for naming a data domain, specifying the type of a data domain, setting the amount of characters to preserve during the tokenization process from a sensitive value to a token value, a Boolean value indicating whether the tokenization service should include illegal characters within the generated token value, and a description of the data domain. In some embodiments, the type of sensitive information may include personally identifiable information, authentication verifiers (e.g., passwords, secrets, keys, etc.), account information, medical information, payment card information, financial account information, device identifiers, internet protocol (IP) addresses, media access control (MAC) addresses, electronic mail addresses, telephone numbers, serial numbers, certificate/license numbers, insurance information, birth dates, social security numbers, etc.

FIG. 6B illustrates an example graphical user interface (GUI) of a management application for setting a policy for log tokenization an integration platform, according to embodiments of the present disclosure.

Referring to FIG. 6B, a management application may present a data domain management interface 604 for managing a data domain of a tokenization policy of an integration platform. As illustrated in FIG. 6B, the data domain management interface 604 may include one or more GUI controls for managing data domains within a tokenization policy. In particular, a platform user may create a data domain using the tokenization policy interface 602. Further, the platform user may employ the data domain management interface 604 to edit the name of a data domain, edit the type of a data domain, set the amount of characters to preserve during the tokenization process from a sensitive value to a token value, set the particular characters to preserve during the tokenization process from a sensitive value to a token value, indicate whether to preserve an invalid format within the generated token value, edit a description of the data domain, and indicate whether to perform validity testing on generated values.

Figure 7:
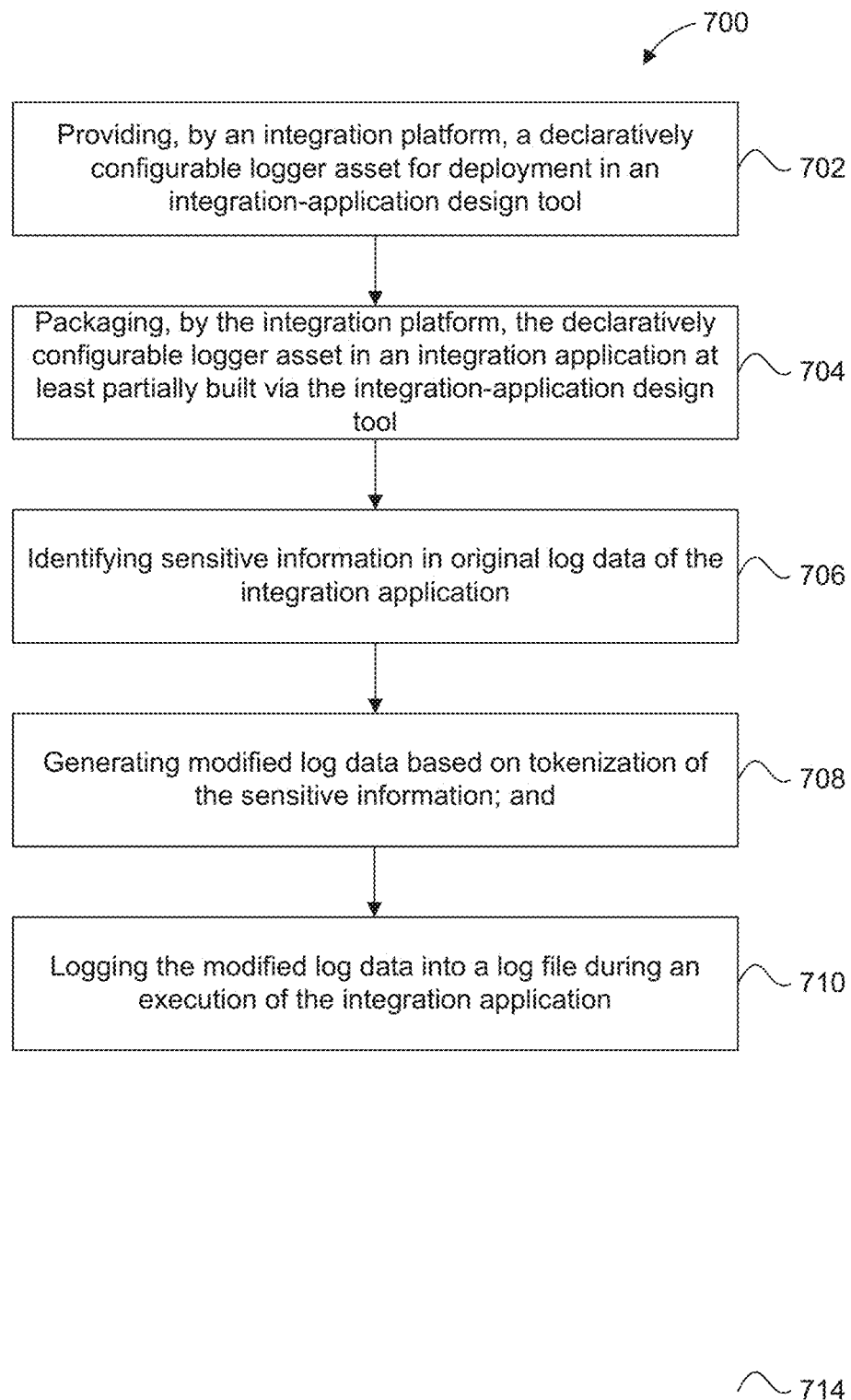
FIG. 7 illustrates a method for implementing log tokenization in an integration platform, according to some embodiments, according to some embodiments.

FIG. 7 illustrates a method 700 for implementing log tokenization in an integration platform, according to some embodiments, according to some embodiments. Method 700 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art(s).

In 702, an integration platform may provide a declaratively configurable logger asset for deployment in an integration-application design tool. For example, an integration-application design tool may provide the asset toolbox 404 including an asset instance 406(1) that may be incorporated into the process flow 408 as the asset 410. The asset 410 may include logging functionality for generating log information pertaining to operations performed by the assets of the process flow 408. Further, as described herein, the asset 410 may be configured using declarative input from a developer. For example, the developer may declaratively program the asset 410 to log specific application information to a log file.

In 704, the integration-application design tool may package the declaratively configurable logger asset in an integration application. For example, the integration-application design tool may be employed to add the asset 410 into the process flow 408 of an integration application. In some instances, a developer may drag and drop the asset instance 406(1) from the asset toolbox 404 to the flow builder interface 402 to construct the process flow 408 to include the asset 410. Additionally, the developer may employ the configuration interface 420 to provide declarative configuration information for the asset 410. For example, the developer may provide declarative statements and/or other configuration information via the configuration interface 420 to declaratively program the logging functionality of the asset 410 within the process flow 408. As a result of the addition of the asset 410 to the process flow 408, the asset 410 may be configured to receive, process, and send event messages as an event processor within the process flow 408 implemented by its corresponding integration application (e.g., the integration applications 102, 202, 504).

Further, the integration-application design tool may generate application code (e.g., a XML configuration file defining configurable attributes of the assets) based upon the process flow 408 and the input to the configuration interface 420. Additionally, the integration-application design tool may package the application code into a deployable file. The deployable file may include the application code, configuration information, and dependencies. In some embodiments, the integration-application design tool may package the integration application into a self-contained Java ARchive (JAR) file.

In 706, the integration platform may identify sensitive information in original log data of the integration application. For example, a deployable file corresponding to the integration application may be deployed to the runtime environment 502 to execute the integration application 504. In some embodiments, the deployable file may be deployed into a cloud environment or an on premises server.

Further, the integration application 504 may be configured to receive a customer information request via the asset 516(1), and query a database for the customer information based on a customer identifier via the asset 516(2). Further, the asset 516(2) may send a third event message 526(1) including the customer information to the asset 516(3) to be logged as log information 530(1). Upon receipt of the third event message 526(1), the asset 516(3) may employ the tokenization logic (e.g., the tokenization logic 212(1)) to determine that the customer information includes sensitive information 532(1).

For instance, the customer information may include a social security, a credit card number, or a password associated with the customer identifier. In some embodiments, the tokenization logic may employ machine learning techniques and/or pattern recognition techniques to determine that the customer information includes sensitive information. Additionally, or alternatively, the tokenization logic may determine whether the customer information includes sensitive information 532(1) based on a log policy 520 indicating the types of sensitive information to tokenize. As an example, the log policy 520 may identify that the integration application 504 should perform tokenization with respect to log data including financial information. As such, the asset 516(3) may employ a machine learning model or pattern recognition algorithm configured to detect financial information. Alternatively, the asset 516(3), may compare the customer information to one or more examples of financial information to determine whether the customer information includes sensitive information. Further, the log policy 520 may be set via the management application 506 or the integration-application design tool.

In 708, the integration application may generate modified log data based on tokenization of the sensitive information. For example, in response to determining that the customer information includes sensitive information 532(1), the tokenization logic (e.g., the tokenization logic 212(1)) may send the sensitive information 532(1) to the tokenization service 508 via the communication network 510. Further, the tokenization service 508 may generate a token value 534(1) based on applying a tokenization algorithm to the sensitive information 532(1). In addition, the tokenization service 508 may send the token value 534(1) to the asset 516(3) via the communication network 510.

In some embodiments, the tokenization service 508 may generate the token value 534(1) based on the log policy 520. For instance, the log policy 520 may configure the tokenization service 508 to preserve attributes of the sensitive information 532(1) in the corresponding token value 534(1) when performing the tokenization process. For instance, the log policy 520 may configure the tokenization service 508 to preserve a particular amount of characters or digits of the sensitive information 532(1) when generating the token value 534(1). Additionally, or alternatively, the log policy 520 may configure the tokenization servicer 508 to preserve characters or digits at particular locations of the sensitive information 532(1) when generating the token value 534(1). In yet still some other instances, the log policy 520 may configure the tokenization service 508 to preserve particular characters or information of the sensitive information 532(1) when generating the token value 534(1). Further, in some embodiments, the tokenization service 508 may employ machine learning techniques to generate the token value 534(1) based on the log policy 520.

Additionally, the tokenization service 508 may preserve a shape and/or invalid format of the sensitive information 532. For example, the tokenization service 508 may determine that the sensitive information 532(1) is a social security number. Further, the tokenization service 508 may determine a shape of a social security number. In addition, the tokenization service 508 may generate the token value 534(1) to have a similar or identical shape to the determined shaped of the sensitive information 532(1).

Furthermore, in some instances, the tokenization service 508 may determine that the sensitive information 532(1) is of an invalid format in comparison to an expected format of a type of the sensitive information 532(1). For instance, the tokenization service 508 may determine that a social security number includes an alphabetic letter. Further, the tokenization service 508 may generate the token value 534(1) to have a similar or identical invalid format to the determined invalid format of the sensitive information 532(1).

In 710, the integration application may log, by the declaratively configurable logger asset, the modified log data into a log file during an execution of the integration application. Upon receipt of the token value 534(1), the asset 516(3) may generate the log information 530(1) including the token value 534(1). In some examples, the integration application 504 may store the log information 530(1) as log files (e.g., the log files 216(1)-(N)). Additionally, or alternatively, the integration application may send the log information 530(1) to the management application 506 for presentation to a platform user via the presentation module 540.

Figure 8:
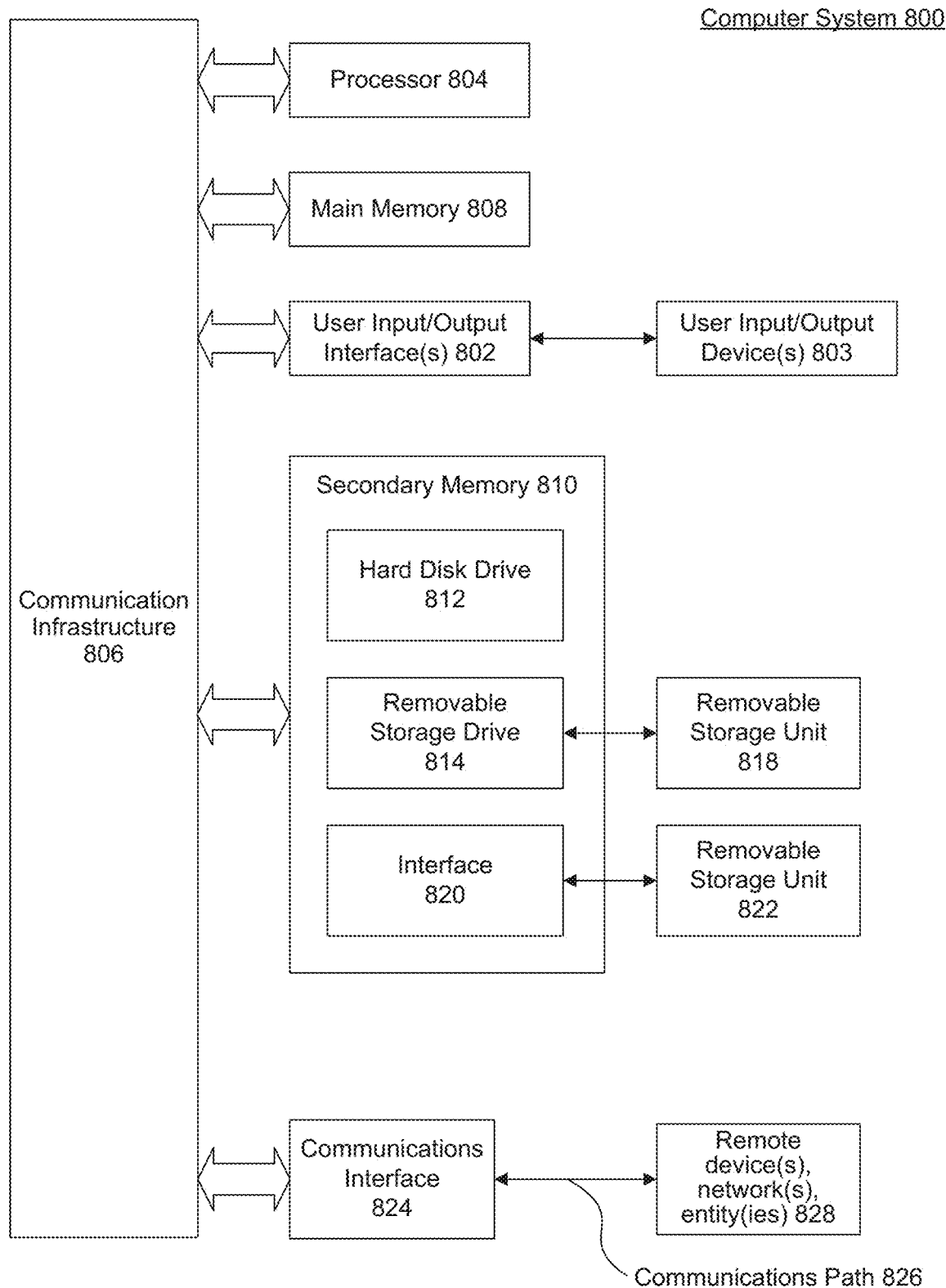
FIG. 8 illustrates a computer system, according to exemplary embodiments of the present disclosure.

FIG. 8 is an example computer system useful for implementing various embodiments. Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 802, such as monitors, keyboards, pointing devices, etc., which may communicate with communication infrastructure or bus 806 through user input/output device(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   providing, by an integration platform on one or more processing devices, a declaratively configurable logger asset for deployment in an integration-application design tool;
   packaging, by the integration platform on the one or more processing devices, the declaratively configurable logger asset in an integration application at least partially built via the integration-application design tool;
   identifying, by the one or more processing devices, sensitive information in original log data of the integration application;
   determining, by the one or more processing devices, a shape of the sensitive information;
   generating, by the one or more processing devices, a token value based on the shape of the sensitive information;
   generating, by the one or more processing devices, modified log data based on replacing at least a portion of the sensitive information with the token value within the original log data; and
   logging, by the declaratively configurable logger asset on the one or more processing devices, the modified log data into a log file during an execution of the integration application.

2. The method of claim 1, further comprising presenting the modified log data via the integration platform.

3. The method of claim 1, wherein identifying the sensitive information in the original log data of the integration application comprises:
   receiving a logging policy indicating a type of the sensitive information; and
   identifying an instance of the type of the sensitive information in the original log data of the integration application.

4. The method of claim 1, wherein the sensitive information is first sensitive information, the original log data is first original log data, the modified log data is first modified log data, and further comprising:
   receiving, during the execution of the integration application, selection of a tokenization setting associated with second sensitive information;
   identifying the second sensitive information in second original log data of the integration application;
   generating second modified log data based on tokenization of the second sensitive information; and
   logging, by the declaratively configurable logger asset, the second modified log data into the log file.

5. The method of claim 1, wherein the sensitive information is first sensitive information, and further comprising:
   receiving, during execution of the integration application, deselection of a tokenization setting associated with a type of second sensitive information; and
   suspending, by the integration application, tokenization of instances of the type of second sensitive information based on the deselection.

6. The method of claim 1, wherein the shape of the sensitive information comprises one or more of a format, length, attribute, validity, characteristic, digits, symbols, language, style, appearance, order, or arrangement of the sensitive information.

7. The method of claim 1, further comprising:
   determining that the sensitive information has an invalid format, wherein generating the token value based on the shape of the sensitive information further comprises generating the token value based on the invalid format.

8. The method of claim 1, wherein the sensitive information includes at least one of personally identifiable information, authentication verifiers, medical information, payment card information, financial account information, a device identifier, an internet protocol addresses, a media access control address, a serial number, or a social security number.

9. A system, comprising:
   a memory; and at least one processor coupled to the memory and configured to:
provide, by an integration platform, a declaratively configurable logger asset for deployment in an integration-application design tool;
package, by the integration platform, the declaratively configurable logger asset in an integration application at least partially built via the integration-application design tool;
identify sensitive information in original log data of the integration application;
determine a shape of the sensitive information;
generate a token value based on the shape of the sensitive information;
generate modified log data based on replacing at least a portion of the sensitive information with the token value within the original log data; and
log, by the declaratively configurable logger asset, the modified log data into a log file during an execution of the integration application.

10. The system of claim 9, wherein the at least one processor is further configured to present the modified log data via the integration platform.

11. The system of claim 9, wherein the sensitive information is first sensitive information, the original log data is first original log data, the modified log data is first modified log data, and the at least one processor is further configured to:
receive, during the execution of the integration application, selection of a tokenization setting associated with second sensitive information;
identify the second sensitive information in second original log data of the integration application;
generate second modified log data based on tokenization of the second sensitive information; and
log, by the declaratively configurable logger asset, the second modified log data into the log file.

12. The system of claim 9, wherein to identify the sensitive information in the original log data of the integration application, the at least one processor is further configured to:
receive a logging policy indicating a type of the sensitive information; and
identify an instance of the type of the sensitive information in the original log data of the integration application.

13. The system of claim 9, wherein the sensitive information is first sensitive information, and the at least one processor is further configured to:
receive, during execution of the integration application, deselection of a tokenization setting associated with a type of second sensitive information; and
suspend, by the integration application, tokenization of instances of the type of second sensitive information based on the deselection.

14. The system of claim 9, wherein to generate the modified log data, the at least one processor is further configured to:
determine that the sensitive information has an invalid format wherein to generate the token value based on the shape of the sensitive information the at least one processor is further configured to generate the token value based on the invalid format.

15. The system of claim 9, wherein the sensitive information includes at least one of personally identifiable information, authentication verifiers, medical information, payment card information, financial account information, a device identifier, an internet protocol addresses, a media access control address, a serial number, or a social security number.

16. The system of claim 9, wherein the shape of the sensitive information comprises one or more of a format, length, attribute, validity, characteristic, digits, symbols, language, style, appearance, order, or arrangement of the sensitive information.

17. A non-transitory computer-readable device having instructions stored thereon that, when executed by at least one computing device, causes the at least one computing device to perform operations comprising:
providing, by an integration platform, a declaratively configurable logger asset for deployment in an integration-application design tool;
packaging, by the integration platform, the declaratively configurable logger asset in an integration application at least partially built via the integration-application design tool;
generating, by another declaratively configurable asset of the integration application, an event message including sensitive information;
identifying the sensitive information within the event message;
determining a shape of the sensitive information;
generating a token value based on the shape of the sensitive information;
generating modified log data based on replacing at least a portion of the sensitive information with the token value within the original log data; and
logging, by the declaratively configurable logger asset, the modified log data into a log file during an execution of the integration application.

18. The non-transitory computer-readable device of claim 17, wherein generating the token value comprises:
determining that the sensitive information has an invalid format, wherein generating the token value based on the shape of the sensitive information further comprises generating the token value based on the invalid format.

19. The non-transitory computer-readable device of claim 17, wherein the another declaratively-configurable asset includes at least one of a connector asset, scope asset, component asset, transformer asset, filter asset, flow control asset, or error handling asset.

20. The non-transitory computer-readable device of claim 17, wherein the shape of the sensitive information comprises one or more of a format, length, attribute, validity, characteristic, digits, symbols, language, style, appearance, order, or arrangement of the sensitive information.

* * * * *